United States Patent [19]

Ohashi et al.

[11] 4,383,963

[45] May 17, 1983

[54] PROCESS FOR ANNEALING HEAT FUSED CAST REFRACTORY PRODUCT

[75] Inventors: Koji Ohashi; Yutaka Hosoda; Toshio Kitamura, all of Takasago, Japan

[73] Assignee: Asahi Glass Company Ltd., Tokyo, Japan

[21] Appl. No.: 252,389

[22] Filed: Apr. 9, 1981

[30] Foreign Application Priority Data

May 2, 1980 [JP] Japan ................................ 55-57772

[51] Int. Cl.$^3$ ............................................. B29C 1/02
[52] U.S. Cl. ...................................... 264/235; 264/332
[58] Field of Search ................................ 264/235, 332

[56] References Cited

U.S. PATENT DOCUMENTS

| | | |
|---|---|---|
| 2,079,101 | 5/1937 | Benner et al. |
| 2,154,153 | 4/1939 | Easter et al. |
| 3,233,994 | 2/1966 | Penberthy ............................ 264/332 |
| 3,599,281 | 8/1971 | Boyer .................................. 264/332 |
| 4,159,359 | 6/1979 | Gervais ............................... 264/332 |
| 4,209,478 | 6/1980 | Wooten ............................... 264/332 |

FOREIGN PATENT DOCUMENTS 51-29172 9/1976 Japan.
53-24081 7/1978 Japan.

Primary Examiner—John A. Parrish
Attorney, Agent, or Firm—Oblon, Fisher, Spivak, McClelland & Maier

[57] ABSTRACT

A process for annealing a heat fused cast refractory product casts a molten refractory material in a mold which is held in a heat insulating material as an annealing medium, said mold being held in said packed heat insulating material which has a thermal conductivity ranging from 0.04 to 0.3 Kcal/m. hr. °C. (at 200° C.) as a heat insulating property and a contraction coefficient of up to 45% under a pressure of 50 Kg/cm$^2$ as a mechanical strength for supporting a mold.

9 Claims, No Drawings

PROCESS FOR ANNEALING HEAT FUSED CAST REFRACTORY PRODUCT

BACKGROUND OF THE INVENTION

1. FIELD OF THE INVENTION

The present invention relates to a process for annealing a heat fused cast refractory product. More particularly, it relates to a process for annealing a heat fused cast refractory material in a mold which is held in a heat insulating material by directly casting a molten refractory material in said cast mold.

2. DESCRIPTION OF THE PRIOR ART

The heat fused cast refractory product (hereinafter referring to as a cast product) is obtained by heat-fusing a refractory material made of desired components in an electric furnace, casting the molten refractory material in a mold having a desired shape and annealing the heat fused cast refractory product.

As the annealing process, it has been mainly employed to anneal a molten refractory material in a mold or a hot cast product taken out of a mold by holding it in a heat insulating material as an annealing medium such as diatomaceous earth powder, alumina powder, sand and chamotto grain as disclosed in U.S. Pat. Nos. 2,154,153; 2,079,101 and Japanese Patent Publication No. 24081/1978. Such annealing processes have serious disadvantages that a lot of dust is generated and an operation is carried out at high temperature to cause serious bad environments in the operation and difficulty for improvements by a machine system, because the cast refractory product is buried or taken out from the heat insulating material as an annealing medium in the transferring system.

On the contrary, it has been employed to cast directly a molten refractory material in an assembled mold held in a heat insulating material in a container as disclosed in U.S. Pat. No. 2,154,153. For example, this process can be employed for a cast product in a system using a graphite mold. This process, however, has not been employed in a system using a sand mold as a casting mold such as a product of a zirconia-alumina-silica type or alumina-silica type cast product, because a mechanical strength of the sand mold is not high enough. It has been proposed to support the sand mold from the rear surfaces by a supporting material as described in Japanese Examined Patent Publication No. 29172/1976, however, such process has required complicated steps. Even though such process is employed, the mold is only partially held whereby it is not enough to prevent breaking of the sand mold in the casting operation.

SUMMARY OF THE INVENTION

It is an object of the present invention to provide a process for annealing a heat fused cast refractory product by a direct casting in a sand mold having a weak strength which is held in a heat insulating material.

The foregoing and other objects of the present invention have been attained by providing a process for annealing a heat fused cast refractory product by casting a molten refractory material in a mold held in a packed heat insulating material as an annealing medium which has a thermal conductivity ranging from 0.04 to 0.3 Kcal/m.hr. °C. (at 200° C.) as a heat insulating property and a contraction coefficient of upto 45% under a pressure of 50 Kg/cm$^2$ as a mechanical strength for supporting a mold.

DETAILED DESCRIPTION OF THE PREFERRED EMBODIMENTS

In accordance with the process of the present invention, excellent labor energy saving effect in an operation can be considered and a cast product maintaining a shape without any crack can be obtained. In order to attain such effects, it has been found to be necessary to anneal the cast refractory product under a desired insulating condition and to satisfy with both of the thermal conductivity and the mechanical strength for supporting a mold.

Various heat insulating materials as annealing media for a casting have been studied. Thus, it has been found that the purpose of the present invention has not been attained by using the conventional heat insulating materials. The results are as follows.

| Heat insulating material | Mechanical strength for supporting | Heat insulation | Trouble in process | Quality of cast product |
|---|---|---|---|---|
| Diatomaceous earth | seriously weak | good | Dusting (impossible for filling process) | — |
| Wet type diatomaceous earth | weak | good | Blending and pressure-molding are required | Deformation of body |
| Sand | good | Quite low heat insulation | | Crackings |
| Bayer's alumina | weak | Low heat insulation | Separation from powder | Crackings |

Various studies have been carried out in order to attain the object of the present invention.

The conditions for the heat insulation and the mechanical strength for supporting a mold of the heat insulating material and the heat insulating material suitable for this purpose have been studied.

In the process of the present invention, it is necessary to give a thermal conductivity of 0.04 to 0.3 Kcal/m.hr. °C. (at 200° C.) as the heat insulation of the heat insulating material.

When the heat conductivity is too low, the heat insulation as the annealing effect is high whereas an annealing velocity for the cast product is disadvantageously too slow and the temperature of the sand mold is too high and a molten adhesion of sand on the cast product is disadvantageously caused. On the other hand, when the thermal conductivity is too high, the heat insulation is not high enough, and crackings may disadvantageously cause depending upon the size and shape of the cast refractory product.

The optimum range of the thermal conductivity is in a range of 0.05 to 0.10 Kcal/m.hr. °C.

The mechanical strength for supporting a mold of the heat insulating material is required as the initial strength for preventing breaking or cracking of the cast mold before a solidification of a sheath of a cast refractory product in the casting of a molten refractory material. It is necessary to give a low contraction coefficient preferably upto 40% under a pressure of 50 Kg/cm$^2$.

In certain mild condition, a desired mechanical strength for supporting mold can be given even though the contraction coefficient is in a range of 40 to 45%. In such condition, the heat insulation can be further improved.

For the contraction coefficient, it is unnecessary to consider the effect of temperature even though the temperature is remarkably high, because the cast mold is used and the cast refractory product imparts self-shape maintenance speedily. The contraction coefficient can be considered as the back-up force for the cast mold. Thus, it can be considered under a pressure of 100 Kg/cm$^2$ or 200 Kg/cm$^2$ regardless of the temperature. The desired contraction coefficient under such pressure can be upto 50% or upto 60%.

The contraction coefficient can be easily measured as a ratio of a reduction of a volume under a compression of the heat insulating material packed in a container such as a cylinder by a piston at a desired pressure.

If the mechanical strength for supporting a mold is not high enough, it is not possible to maintain a shape of a sand mold (prepared by bonding sand with a binder) in the casting of a molten refractory material. The optimum range of the contraction coefficient applied for all cases regardless a shape and size of a cast refractory product is about 25 to 35% under a pressure of 50 Kg/cm$^2$.

The heat insulating material as an annealing medium used in the present invention will be further illustrated.

As described, the conventional heat insulating materials may not be satisfactory and a new heat insulating material is required. Sometimes, the conventional heat insulating material can be selected and modified by a processing or a treatment to use it for the purpose of the present invention. Thus, it is preferable to use the following heat insulating material.

The heat insulating material suitable for the purpose of the present invention is a grain having grain sizes of 0.1 to 6 mm for whole or a most part such as at least 90% of the grain as a light refractory aggregate. The grain is packed around the cast mold preferably at a bulk density of upto 0.5.

The optimum heat insulating material is foam silica grog having high heat insulation. It is also preferable to use an insulated chamotto, an alumina molten follow grain or a light alumina grain. Among them, the foam silica grog has the same annealing curve as that of diatomaceous earth and has substantially the same mechanical strength for supporting a mold as that of sand and has not any adverse effect to the cast refractory product. Moreover, it can be recovered and reused at a ratio of more than 95% after the application. Therefore, the foam silica grog is superior to others.

In the present invention, the heat insulating material is used as an insulated back-up material for supporting the cast mold especially a sand mold having lower mechanical strength to pack it in a container for annealing a cast refractory product to give a desired heat insulation and a desired mechanical strength for supporting a mold. A molten refractory material is casted in a cast mold held in the heat insulating material. After the casting, the heat insulating material is put on the cast refractory product to attain the annealing of the cast refractory product.

In accordance with the annealing process of the present invention, the cast refractory product in the cast mold can be easily obtained without cracking in a desired form. The industrial advantages of the present invention are remarkable.

The present invention will be further illustrated by certain examples and references which are provided for purposes of illustration only and are not intended to be limiting the present invention.

EXAMPLE 1

In a box type annealing container made of iron having an upper opening of 1050 m and 1500 mm and a height of 650 mm, a foam silica grog was packed as an annealing medium under the following condition. A conventional sand mold assembled in a desired shape having a casting inlet at an upper part was held in the annealing medium.

| Foam silica grog: | |
|---|---|
| Composition (wt. %) | |
| SiO$_2$: 85-95; | Al$_2$O$_3$: 2-5; |
| CaO: 0-1; | Na$_2$O: 0-2; |
| K$_2$O: 0-2. | |
| Melting point: | 1500° C. |
| Grain size: | 2-4 mm: 80-100% |
| | 0.1-2 mm: 0-20% |
| Bulk density: | 0.3-0.5 |
| Specific heat: | 0.2 Kcal/Kg °C. |
| Stability against heat cycling: | |

Change of bulk density was measured after heating it at 1250° C. for 4 hours.

| No. of heats | Bulk density |
|---|---|
| 0 initial | 0.40 |
| 1 | 0.40 |
| 3 | 0.40 |
| 5 | 0.39 |

The data suggest that the foam silica grog had sufficient properties both as an annealing medium to a fusion casting and as a backing medium to a sand mold.

| Condition for packing foam silica grog.: | |
|---|---|
| Thermal conductivity: 0.05-0.08 Kcal/m. hr. °C. | |
| Mechanical strength for supporting mold: | |
| Contraction coefficient under | |
| 50 Kg/cm$^2$ | about 30% |
| 100 Kg/cm$^2$ | about 40% |
| 200 Kg/cm$^2$ | about 50% |

A refractory material containing zircon and Bayer's alumina as main components was molten by an arc electric furnace and casted in various sand molds which were prepared by said conditions. After each casting, each sand mold containing the cast refractory product was covered with the same foam silica grog to anneal it for 7 days and the cast product was taken out. The test results of the cast products are as follows.

| Chemical analysis: (wt. %) | |
|---|---|
| ZrO$_2$: 32% | Al$_2$O$_3$: 50% |
| SiO$_2$: 16% | Na$_2$O: 1.1% |
| Fe$_2$O$_3$ + TiO$_2$: 0.1% | |
| Shape and observation: | |

TABLE 1

| Sample | 1 | 2 | 3 |
|---|---|---|---|
| Shape (mm) | 300 × 450 × 600 | 90 × 500 × 600 | 250 × 635 × 1015 |
| Weight (Kg) | 284 | 95 | 560 |
| Cracking | none | only small no trouble | none |

TABLE 1-continued

| Sample | 1 | 2 | 3 |
| --- | --- | --- | --- |
| Deformation of body in side (mm) | +2-+3 no trouble | +3-+4 no trouble | +2-+4 no trouble |

Note 1:
The sand molds were not broken by the casting.
Note 2:
The annealing curve of the Sample 1 was measured. This was similar to that of the conventional diatomaceous earth annealing medium and was slower than that of the sand annealing medium. It was confirmed to have enough annealing property.

EXAMPLE 2

In accordance with the process of Example 1 except that a contraction coefficient of the foam silica grog under 50 Kg/cm² as a mechanical strength for supporting a mold was 38%, the annealing tests were carried out. The results are shown in Table 2.

TABLE 2

| Sample | 4 | 5 | 6 |
| --- | --- | --- | --- |
| Shape (mm) | 300 × 450 × 600 | 90 × 500 × 600 | 250 × 450 × 1200 |
| Weight (Kg.) | 284 | 95 | 500 |
| Cracking | none | none | none |
| Deformation of body in side (mm) | +2-+3 no trouble | +3-+4 no trouble | +3-+4 no trouble |

EXAMPLE 3

In accordance with the process of Example 1 except that a contraction coefficient of the foam silica grog under 50 Kg/cm² as a mechanical strength for supporting a mold was 43%, the annealing tests were carried out. The results are shown in Table 3.

TABLE 3

| Sample | 7 | 8 | 9 |
| --- | --- | --- | --- |
| Shape (mm) | 300 × 450 × 600 | 90 × 500 × 600 | 250 × 450 × 1200 |
| Weight (Kg.) | 284 | 95 | 500 |
| Cracking | none | none | none |
| Deformation of body in side (mm) | +3-+5 | +3-+5 | +5-+7 |

These cast refractory products can be used without trouble. Thus, the dimensional accuracy of the products is not high enough whereby it may be necessary to grind the product before the use for some application.

When a contract coefficient of the foam silica grog under 50 Kg/cm² is 50%, a sand mold was broken by casting a product as Samples 8 and 9 and, a cast product obtained by casting a product as Sample 7 had unevenness of deformation of the body in side. The product is not suitable for use after grinding.

We claim:

1. In a process for annealing a heat fused cast refractory product by casting a molten refractory material in a sand mold which is held in a heat insulating material as an annealing medium, an improvement characterized in that said mold is held in said packed heat insulating material which has a thermal conductivity ranging from 0.04 to 0.3 Kcal/m.hr. °C. (at 200° C.) as a heat insulating property and a contraction coefficient of upto 45% under a pressure of 50 Kg/cm² as a mechanical strength for supporting a mold.

2. The process for annealing according to claim 1 wherein said mold is held in said packed heat insulating material which has a contraction coefficient of upto 40% under a pressure of 50 Kg/cm² as a mechanical strength for supporting a mold.

3. The process for annealing according to claim 2 wherein said contraction coefficient of upto 25 to 35% under a pressure of 50 Kg/cm² as a mechanical strength for supporting a mold.

4. The process for annealing according to claim 1 wherein said mold is held in said packed heat insulating material which has a thermal conductivity ranging from 0.05 to 0.1 Kcal/m.hr. °C.

5. The process for annealing according to claim 1 wherein said heat insulating material is a grain having a grain size of 0.1 to 6 mm in whole or substantial part which is packed around said mold.

6. The process for annealing according to claim 1 or 5 wherein a light weight refractory aggregate as said heat insulating material is packed to be a bulk density of upto 0.5.

7. The process for annealing according to claim 1 or 3 wherein said heat insulating material is at least one of foam silica grog insulated chamotto bubbled Al₂O₃, and light weight alumina grain.

8. The process for annealing according to claim 7 wherein said heat insulating material is the foam silica grog.

9. The process for annealing according to one of claims 1 to 8 wherein said mold is a sand mold.

* * * * *